United States Patent [19]

Taylor

[11] 4,040,552
[45] Aug. 9, 1977

[54] STRIPPING FLASH FROM BLOW MOULDED HOLLOW CONTAINERS

[75] Inventor: Robert W. Taylor, Bletchley, England

[73] Assignee: Plysu Limited, England

[21] Appl. No.: 675,634

[22] Filed: Apr. 9, 1976

Related U.S. Application Data

[63] Continuation of Ser. No. 468,384, May 9, 1974, abandoned.

[30] Foreign Application Priority Data

May 18, 1973  United Kingdom ............. 23818/73

[51] Int. Cl.² ............................................. B26F 3/02
[52] U.S. Cl. .................................... 225/1; 225/103
[58] Field of Search ................. 225/93, 94, 103, 104, 225/97, 1, 3; 83/636, 914; 264/161; 425/806 R, 806 A

[56] References Cited

U.S. PATENT DOCUMENTS

| | | | |
|---|---|---|---|
| 1,428,355 | 9/1922 | Bradley | 83/636 X |
| 2,936,665 | 5/1960 | Naffin | 83/636 X |
| 3,149,765 | 9/1964 | Horning et al. | 225/103 X |
| 3,377,899 | 4/1968 | Wolford | 83/914 X |
| 3,464,084 | 9/1969 | Thompson | 225/94 X |
| 3,494,520 | 2/1970 | Bewalda et al. | 225/103 X |
| 3,661,488 | 5/1972 | Latreille | 83/636 X |
| 3,803,968 | 4/1974 | Black | 83/636 X |

*Primary Examiner*—Frank T. Yost
*Attorney, Agent, or Firm*—Kemon & Estabrook

[57] ABSTRACT

A method of and apparatus for stripping a flash from a blow moulded hollow container in which the container is located at a stripping station with its flash projecting in a predetermined direction and in which a powered stripping tool is driven along a line parallel with, but spaced from, the jointline from which the flash is projecting such that the flash is progressively stripped away from the container along the jointline.

4 Claims, 4 Drawing Figures

STRIPPING FLASH FROM BLOW MOULDED HOLLOW CONTAINERS

This is a continuation of application Ser. No. 468,384 filed May 9, 1974, now abandoned.

A problem which exists in the production of blow moulded hollow containers is the removal of the excess plastics material which is squeezed between the two parts of the mould when the two parts come together around the initial hollow tube of plastics material. The excess material appears as strips along the jointlines at the top and bottom of the final container and these strips are generally known as flashes. In the following description, and in the accompanying claims, the term "flash" refers to the fin-like web which projects from the surface of a blow-moulded container after the moulding operation, and which is formed in the moulding operation by material which has been pinched between the two halves of the mould.

At present the removal of these flashes is a manual task and is performed with a knife. Attempts to automate the process using a reciprocating cutting tool having a cutting edge extending the length of the flash have not proved entirely successful. This is largely due to the tremendous pressure required to shear off each flash using such a cutting blade. For large containers a pressure of 8 to 10 tons would be required. Another reason is that the bottom of a container is often undercut and straightforward shearing of the flash from the bottom of such a container is not feasible.

In accordance with the present invention a flash is stripped from the end of a blow moulded hollow container by locating the container at a stripping station with the flash projecting in a predetermined direction, and then reciprocating a powered stripping tool along a line parallel with but spaced from the jointline from which the flash is projecting such that the flash is progressively stripped away from the container as the tool is driven from one end of the jointline to the other. In a preferred embodiment of the invention, the stripping tool is generally U-shaped and is mounted for reciprocation along the said line with its two arms engaging opposite sides of the flash. Each arm of the tool includes a stripping surface inclined so as to exert a deflecting force on a flash during the forward movement of the tool, the deflecting force having a first component in the direction of travel, a second transverse component directed inwardly toward the other arm such that the flash is pushed out of the path of the tool, and a third component directed outwardly away from the jointline. The force thereby progressively tears or peels the flash away from the container. Each arm may also include a guide surface inclined to guide the flash into the opening between two arms of the tool. The initial stripped material is then compressed by a backing surface at the back end of the opening between the arms and the resulting pressure further assists the stripping of the remaining unstripped portion of the flash from the container.

In a method of automatically stripping the flashes from a container using a pair of stripping devices embodying the present invention, a container is first fed into a stripping station and urged against an adjustable backplate by a retaining arm. With the container correctly positioned and held by the retaining arm, a microswitch is closed to enable a timer which controls the various stripping operations. The two stripping tools are first reciprocated along lines parallel with and closely adjacent the jointlines at the top and bottom of the container to strip the flashes, and then a punching tool is moved into position and energised to punch out the container handle. After this the retaining arm is released and the backplate pushes the container out of the stripping station to an outstacking device. The stripped flashes may be collected and re-circulated back into the hopper which supplies the raw material for the blow moulding process. The next container is then fed into the stripping station. If the container is not correctly seated in the stripping station the microswitch is not closed and a pair of support arms beneath the container are raised to eject the container on to a moving conveyor.

In order that the invention may be more clearly understood, one example of the invention will now be described with reference to the accompanying drawings, in which.

Figure 1:
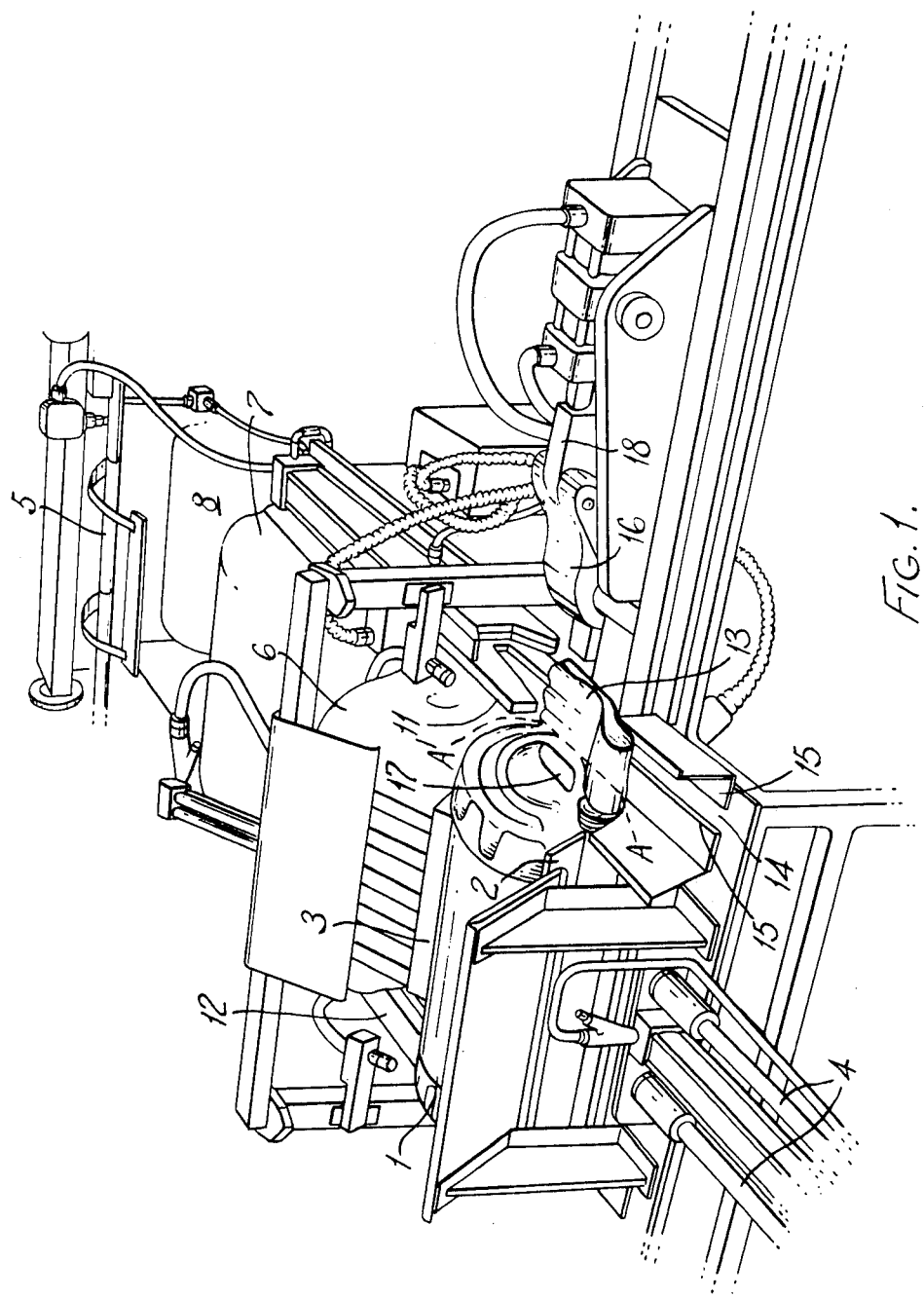
FIG. 1 is a perspective view of a device for stripping the flashes from blow-moulded containers.
Figure 2:
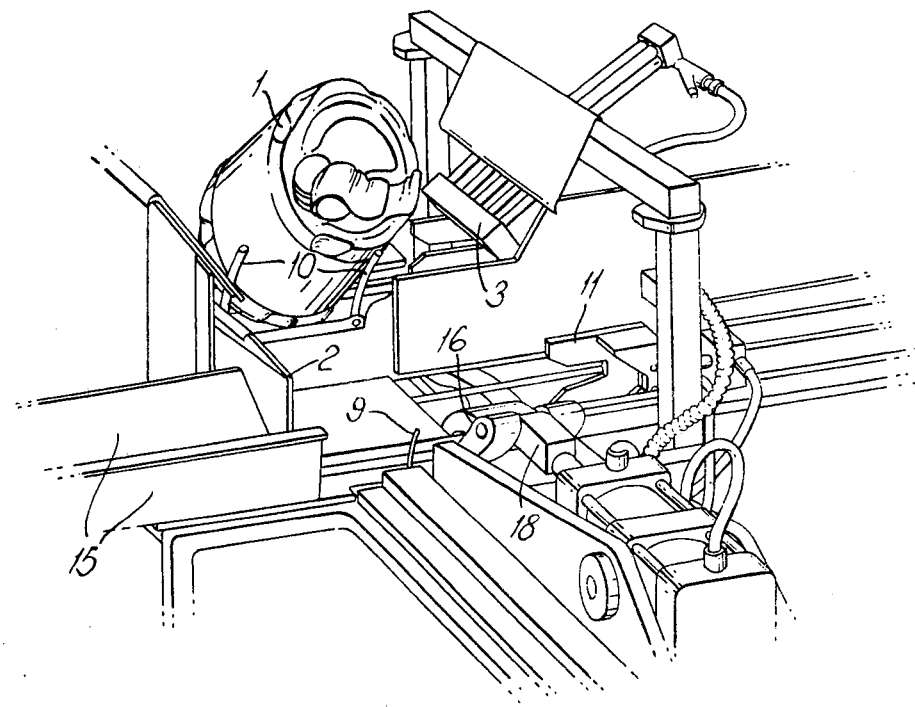
FIG. 2 is another perspective view of the device shown in FIG. 1 showing the manner in which the containers are supported and, if necessary, ejected from the stripping station.
Figure 4:
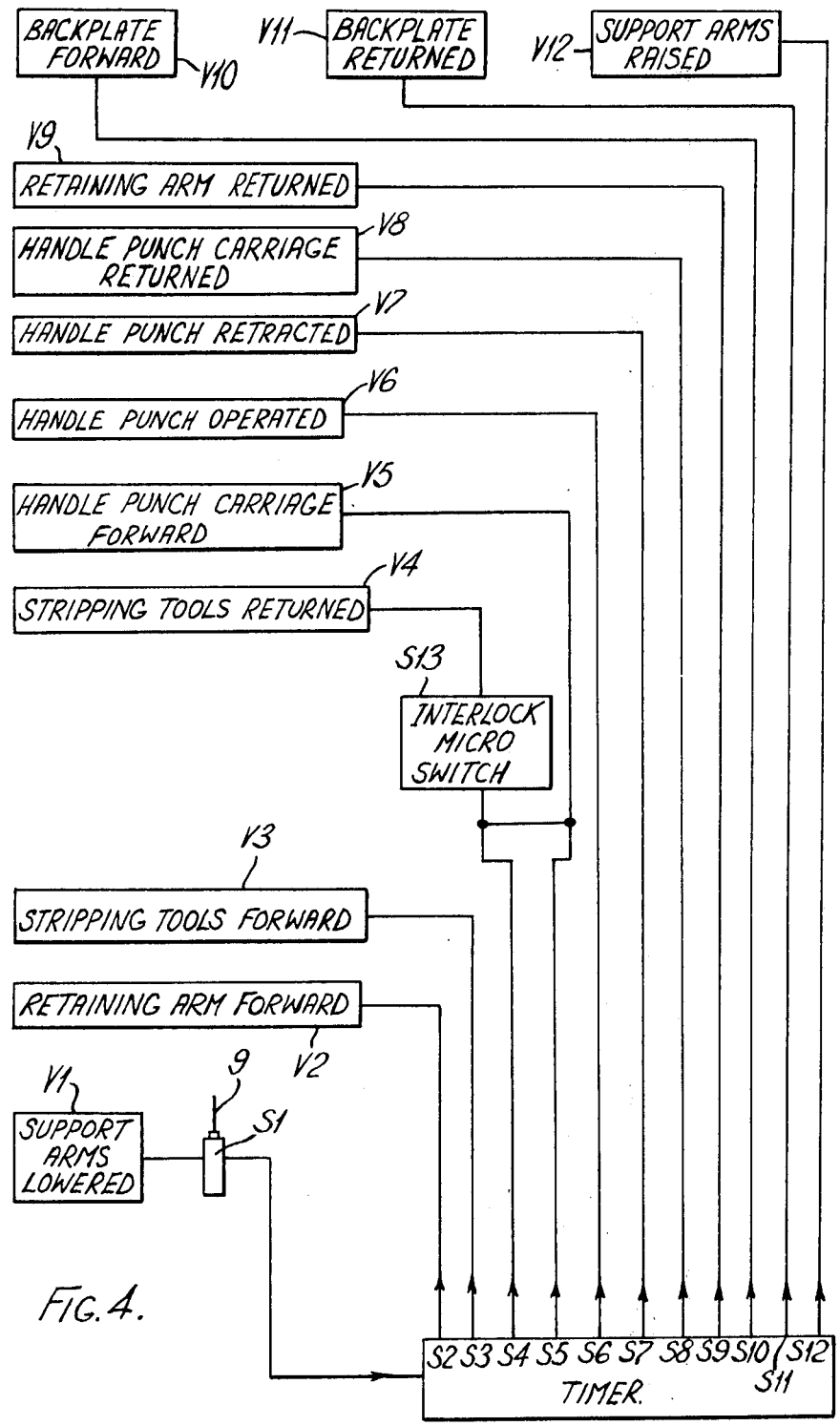
FIG. 4 is a block diagram illustrating the control circuit for controlling te sequence of operations during removal of the flashes.

Referring first to FIGS. 1, 2 and 4 a blow-moulded container 1 is first moved into a stripping station by lowering support arms 10 (FIG. 2). The support arms 10 are pneumatically driven from an air cylinder in response to a signal from the blow-moulding machine (not illustrated) to a solenoid valve V1.

If the container 1 is correctly seated at the stripping station, it deflects a microswitch whisker 9 to close a microswitch S1. This actuates a timer consisting essentially of a drum with cams operating microswitches S2–S12 (FIG. 4) to control the sequence of pneumatic stripping operations by selectively energising solenoid valves V2–V12, each valve controlling an air cylinder.

The closing of the microswitch S1 also releases an interlock which otherwise prevents operation of the air cylinders associated with the valves V2–V11. Thus, if the microswitch whisker 9 has not been deflected a predetermined time after the signal has been received from the blow-moulding machine to lower the support arms 10, the timer drum is started automatically and the interlock prevents operation of all of the air cylinders with the exception of the air cylinder associated with the valve V12. This valve is therefore energised at the end of the timer cycle by the closing of switch S12, and the support arms 10 are thereby raised to eject the container from the stripping station.

Assuming now that a container has been correctly seated at the stripping station, the timer drum closes switch S2 and the air cylinder associated with valve V2 is energised to drive a retaining arm 3 which urges the container 1 against an adjustable backplate 2. The adjustability of the backplate accommodates different sized containers at the stripping station.

The timer next closes switches S3, S4 and the air cylinders associated with valves V3 and V4 reciprocate the stripping tools 11 and 12 to strip the flashes projecting from the top and bottom of the container. In FIG. 1 only the flash 13 projecting from the top of the container is visible. Each stripping tool is mounted for reciprocation along a line parallel with and closely adjacent the jointline between the projecting flash and the body of the container. Thus the stripping tool 11 strips the flash 13 from along the jointline A—A' as it reciprocates within a gap 14 between two cheeks 15. The purpose of the cheeks 15 is to guide the stripped off flash to a vertical elevator (not shown) which discharges into a granulating machine where the flash is chipped ready for re-use.

Figure 3:
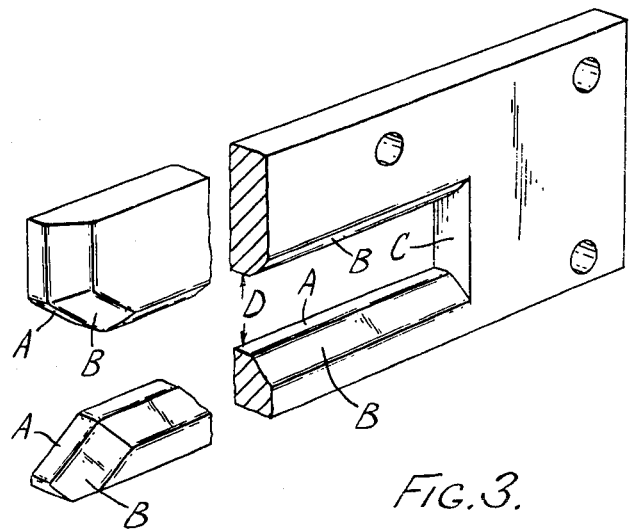
FIG. 3 is a perspective view of a stripping tool for use in the device of FIGS. 1 and 2.

The stripping tool is shown in more detail in FIG. 3. The average thickness of the flash will be slightly less than the width of the gap D between the two jaws of the tool to accommodate slight variations in the precise location of the flash during successive stripping operations. Moreover, the extra width of the gap helps prevent jamming of the stripped material between the arms when the material bunches or concertinas during a stripping operation. On the other hand, around the neck of the container the flash will be much thicker than the width of the gap so that this portion of the flash is squashed between the jaws during the stripping operation.

The tool includes a first pair of opposed, bevelled faces A which, during the forward movement of the tool, guide the flash between the upper and lower jaws of the tool. At the same time a second pair of opposed, bevelled faces B push the flash forward as well as either up or down depending on whether the flash engages the lower or upper jaw of the tool respectively. The bevelled faces B also exert a force urging the flash outwards away from the container. During the initial forward movement of the tool this combined action begins to tear the flash away from the container along the weakened jointline where the flash is attached to the container. Further movement of the tool brings the flat back surface C into engagement with the material in the slot D and the surface C then assists the tearing action produced by the combined effect of surfaces B and A so that the flash is quickly removed. Because the action is essentially one of tearing along a weakened line while the stripping device is moved along a line parallel with but space slightly from the weakened line, the stripping device is advantageously used on containers where the flash projects from an undercut surface.

After the flashes have been removed, closure of switches S5 to S8 energises the air cylinders associated with valves V5 to V8. This moves forward a carriage 18 for a punching tool 16, operates the tool to punch out a hole 17 to form the handle of the container 1, retracts the tool, and finally returns the carriage 18 to the position shown in FIG. 1.

Subsequent closure of switch S9 energises the air cylinder associated with valve V9 to cause retraction of the retaining arm 3. Backplate 2 is mounted for movement in a direction controlled by guide rods 4 so that closure of switches S10, S11 to energise the cylinders associated with valves V10 and V11 reciprocated the backplate along the guide rods and the container 1 is thereby pushed out of the stripping station toward an outstacking device 5. FIG. 1 illustrates the preceding containers 6, 7 and 8 being shunted toward the outstacking device.

I claim:

1. A device for stripping a fin-like flash projecting substantially perpendicularly from a surface of a blow-moulded hollow container, comprising: means for locating a container at a stripping station with the fin-like flash located in a first plane and the surface of the container from which the flash is projecting located in a second plane, and a powered stripping tool which includes two parallel stripping jaws, the tool being mounted for reciprocation with the two jaws reciprocating on opposite sides of the said first plane, the forwardmost portion of each jaw which first engages the flash including a stripping surface which is acutely inclined firstly with respect to both the first and second planes and also with respect to a third plane perpendicular to both the first and second planes whereby, when the said stripping surface engages the flash, the resulting force on the flash includes a first component urging the flash out of the path of the tool in the direction of travel, a second component urging the flash out of the path of the tool and away from the said surface of the container and a third component urging the flash out of the path of the tool and inwardly toward the other stripping jaw.

2. A device according to claim 1 in which the stripping tool comprises a flat substantially rectangular block having a first surface facing the container and a second surface facing outwardly away from the container, the block having a slot which extends between the first and second surfaces to form the said pair of stripping jaws, the opposing edges of the slot in the second surface of the block being bevelled to provide said inclined stripping surfaces.

3. A device according to claim 2 in which the opposing corners of the slot in the second face of the block at the open end of the slot are bevelled to provide guide surfaces for feeding the flash into the slot.

4. A method of stripping a fin-like flash from a blow-moulded hollow container wherein the flash projects from the surface of the container in a fixed plane normal thereto and is connected to the container by a weakened joint line, comprising locating the container at a stripping station, driving a powered stripping tool from one end of the flash to the other along a straight path parallel to the weakened joint line between the flash and the container, the tool having a pair of parallel stripping jaws each including a stripping surface inclined to said fixed plane, the two stripping surfaces engaging respective opposing faces of flash during movement of the tool along said path and thereby exerting a deflecting force on said faces, said force including a first component in the direction of travel, a second transverse component directed inwardly toward the other stripping surface, and a third component directed outwardly away from the container.

* * * * *